United States Patent [19]

Moriya et al.

[11] Patent Number: 4,607,087

[45] Date of Patent: Aug. 19, 1986

[54] METHOD FOR PRODUCING A PLASTIC LENS

[75] Inventors: Yasuo Moriya, Chita; Kyosuke Fukushi, Kuwana; Masaharu Nakayama, Nagoya, all of Japan

[73] Assignee: Nippon Oil and Fats Company Ltd., Japan

[21] Appl. No.: 478,023

[22] Filed: Mar. 23, 1983

[30] Foreign Application Priority Data

Mar. 29, 1982 [JP] Japan ................ 57-50700

[51] Int. Cl.⁴ .............. C08F 4/28; C08F 118/24; C08F 218/24
[52] U.S. Cl. .................... 526/227; 526/314
[58] Field of Search ................ 526/314, 227

[56] References Cited

U.S. PATENT DOCUMENTS

| | | | |
|---|---|---|---|
| 2,464,062 | 3/1949 | Strain | 526/314 |
| 3,038,210 | 6/1962 | Hungerford et al. | 18/58 |
| 3,119,802 | 1/1964 | Guillet . | |
| 3,293,233 | 12/1966 | Erchak, Jr. et al. | 526/227 |
| 3,420,807 | 1/1969 | Harrison et al. | 526/227 |
| 3,451,989 | 6/1969 | Rekers et al. . | |
| 3,872,042 | 3/1975 | Bond | 264/1.1 |
| 4,126,737 | 11/1978 | Grüber et al. | 526/314 |
| 4,260,564 | 4/1981 | Baiocchi et al. | 264/2.2 |
| 4,393,184 | 7/1983 | Tarumi et al. | 264/1.1 |
| 4,396,737 | 8/1983 | Leatherman | 526/228 |

FOREIGN PATENT DOCUMENTS

| | | | |
|---|---|---|---|
| 0080338 | 1/1983 | European Pat. Off. . | |
| 2757440 | 7/1978 | Fed. Rep. of Germany | 526/228 |
| 50-45889 | 4/1975 | Japan | 526/314 |

*Primary Examiner*—Joseph L. Schofer
*Assistant Examiner*—Peter F. Kulkosky
*Attorney, Agent, or Firm*—Parkhurst & Oliff

[57] ABSTRACT

A plastic lens which has high hardness and excellent scratch resistance and can form a transparent and uniform reflection preventing film through vacuum deposition, is produced by mixing (a) diethylene glycol bis(allyl carbonate) with (b) at least one of organic peroxides having a decomposition temperature at selected half-life value for ten hours of not higher than 80° C. and (c) at least one of organic peroxides having a decomposition temperature at selected half-life value for ten hours of 90°–110° C., which have no copolymerizability to the diethylene glycol bis(allyl carbonate) (a), as a polymerization initiator, and polymerizing and casting the resulting mixture in a desired lens-forming mold.

14 Claims, No Drawings

METHOD FOR PRODUCING A PLASTIC LENS

BACKGROUND OF THE INVENTION

1. Field of the Invention

The present invention relates to a method for producing a plastic lens having high hardness and excellent scratch resistance by polymerizing and casting a diethylene glycol bis(allyl carbonate) in a desired lens-forming mold.

2. Description of the Prior Art

Plastic lenses produced by polymerizing and casting diethylene glycol bis(allyl carbonate) by using organic peroxides having a decomposition temperature at selected half-life value for ten hours of not higher than 80° C., particularly di-isopropyl peroxydicarbonate, as a polymerization initiator have been very important particularly as spectacle lenses, because plastic lenses have many characteristics not possessed by usual glass lenses. For example, they are light in weight and dyeable.

However, plastic lenses have great drawbacks in that they are readily scratched because of lower hardness than glass lenses. For obviating this drawback, plastic lenses having equal surface hardness and scratch resistance to glass lenses have been produced by applying a thermosetting resin, such as a silicone resin, a polyester resin, a melamine resin and the like or a polyfunctional monomer, such as allyl acrylate or allyl methacrylate on surfaces of a plastic lens obtained from diethylene glycol bis(allyl carbonate) and thermosetting said resin or monomer, and these lenses are commercially available.

Although these plastic lenses wherein a thermosetting resin and the like have been applied on the surfaces of the lens have highly improved surface hardness and scratch resistance, the excellent dyeability which is one of great characteristics of plastic lenses is lost. Furthermore, new drawbacks have been caused. For example, the steps for coating and curing the thermosetting resin are added and it is difficult uniformly to coat the thermosetting resin and the like on the surfaces of the lens, so that the precision of the surfaces of the lens is lowered and the production of lenses having complicated shapes becomes difficult. In addition, in plastic lenses, unpolymerized substances, such as diethylene glycol bis(allyl carbonate) remain in the lens different from glass lens, irrelative to the practice of the surface working and these remained substances make the uniform formation of reflection preventing film through vacuum evaporation difficult.

SUMMARY OF THE INVENTION

The inventors have experimented with the production of plastic lenses which obviate a variety of drawbacks possessed by the above described surface-worked plastic lenses and have high hardness and excellent scratch resistance and can form a transparent and uniform reflection preventing film by vacuum deposition and found a method for producing such plastic lenses by polymerizing diethylene glycol bis(allyl carbonate) by using an organic peroxide having a decomposition temperature at selected half-life value for ten hours of not higher than 80° C. (in benzene, 0.05 mol/l) together with a specific peroxide as a polymerization initiator and the present invention has thus been accomplished.

The present invention lies in a method for producing plastic lenses by mixing (a) diethylene glycol bis(allyl carbonate) with (b) at least one of organic peroxides having a decomposition temperature at selected half-life value for ten hours of not higher than 80° C. and (c) at least one of organic peroxides having a decomposition temperature at selected half-life value for ten hours of 90°–110° C., which have no copolymerizability to the diethylene glycol bis(allyl carbonate) (a), as a polymerization initiator, and polymerizing and casting the resulting mixture in a desired lens-forming mold.

DESCRIPTION OF THE PREFERRED EMBODIMENTS

In the present invention, as the above described polymerization initiator (b), use may be made of at least one of organic peroxides selected from the group consisting of (I) peroxyesters, (II) peroxydicarbonates and (III) diacyl peroxides.

The above described peroxyesters (I) are at least one of organic peroxides selected from the group consisting of cumyl peroxyneodecanoate, tert.-butyl peroxyneodecanoate, tert.-butyl peroxypivalate, tert.-butyl peroxy(2-ethylhexanoate), and tert.-butyl peroxyisobutyrate.

The above described peroxydicarbonates (II) are at least one of organic peroxides selected from the group consisting of di-isopropyl peroxydicarbonate, di-normal-propyl peroxydicarbonate, di-myristyl peroxydicarbonate, di-(2-ethoxyethyl)peroxydicarbonate, di-(methoxyisopropyl)peroxydicarbonate, di-(2-ethylhexyl)peroxydicarbonate and di-(3-methyl-3-methoxybutyl)peroxydicarbonate.

Furthermore, as the above described peroxydicarbonate (II), use may be made of di-isopropyl peroxydicarbonate.

The above described diacyl peroxides (III) are at least one of organic peroxides selected from the group consisting of 3,5,5-trimethylhexanoyl peroxide, octanoyl peroxide, decanoyl peroxide, lauroyl peroxide, acetyl peroxide, meta-toluyl peroxide and benzoyl peroxide.

In the present invention, as the above described organic peroxides (c) having a decomposition temperature at selected half-life value for ten hours of 90°–110° C. and having no copolymerizability to diethylene glycol bis(allyl carbonate), use may be made of at least one of organic peroxides selected from the group consisting of peroxyesters (IV), peroxycarbonates (V), peroxyketals (VI) and ketone peroxides (VII).

In the present invention, the above described peroxyesters (IV) are at least one of organic peroxides selected from the group consisting of tert.-butyl peroxymaleate, tert.-butyl peroxylaurate, tert.-butyl peroxy 3,5,5-trimethylhexanoate, 2,5-dimethyl-2,5-di(benzoyl peroxy)hexane, tert.-butyl peroxyacetate, tert.-butyl peroxybenzoate, tert.-butyl peroxyisophthalate.

The above described peroxycarbonate (V) is tert.-butyl peroxyisopropylcarbonate.

The above described peroxyketals (VI) are at least one of organic peroxides selected from the group consisting of 1,1-bis(tert.-butyl peroxy)-3,3,5-trimethylcyclohexane, 1,1-bis(tert.-butyl peroxy)cyclohexane, 2,2-bis(tert.-butyl peroxy)octane, 2,2-bis(tert.-butyl peroxy)butane, normal-butyl-4,4-bis(tert.-butyl peroxy)valerate.

The above described ketone peroxides (VII) are at least one of cyclohexanone peroxide and methyl ethyl ketone peroxide.

Organic peroxides (b) having a decomposition temperature at selected half-life value for ten hours of not higher than 80° C. are listed in the following Table 1.

TABLE 1

| No. | Organic peroxide | Decomposition temperature at selected half-life value for 10 hours (°C.) |
|---|---|---|
| 1 | Cumyl peroxyneodecanoate (I) | 36.6 |
| 2 | Di-isopropyl peroxydicarbonate (II) | 40.5 |
| 3 | Di-normal-propyl peroxydicarbonate (II) | 40.5 |
| 4 | Di-myristyl peroxydicarbonate (II) | 40.9 |
| 5 | Di-(2-ethoxyethyl) peroxydicarbonate (II) | 43.4 |
| 6 | Di-(methoxyisopropyl) peroxydicarbonate (II) | 43.4 |
| 7 | Di-(2-ethylhexyl) peroxydicarbonate (II) | 43.5 |
| 8 | Di-(3-methyl-3-methoxybutyl) peroxydicarbonate (II) | 46.8 |
| 9 | Tert.-butyl peroxyneodecanoate (I) | 48.0 |
| 10 | Tert.-butyl peroxypivalate (I) | 55.0 |
| 11 | 3,5,5-trimethylhexanoyl peroxide (III) | 59.5 |
| 12 | Octanoyl peroxide (III) | 61.0 |
| 13 | Decanoyl peroxide (III) | 62.0 |
| 14 | Lauroyl peroxide (III) | 62.0 |
| 15 | Acetyl peroxide (III) | 68.0 |
| 16 | Tert.-butyl peroxy(2-ethyl hexanoate) (I) | 72.5 |
| 17 | Meta-toluyl peroxide (III) | 73.0 |
| 18 | Benzoyl peroxide (III) | 74.0 |
| 19 | Tert.-butyl peroxyisobutyrate (I) | 78.0 |
| 20 | Di-allyl peroxydicarbonate (II) | 40.5 |
| 21 | Di-methallyl peroxydicarbonate (II) | 40.0 |

In the above Table, classes (I), (II), and (III) show peroxyesters, peroxydicarbonates and diacyl peroxides respectively.

These organic peroxides are used alone or in combination of two or more peroxides.

Organic peroxides (c) having a decomposition temperature at selected half-life value for ten hours of 90°–110° C. and having no copolymerizability to diethylene glycol bis(allyl carbonate) are shown in the following Table 2.

TABLE 2

| No. | Organic peroxide | Decomposition temperature at selected half-life value for 10 hours (°C.) |
|---|---|---|
| 1 | 1,1-bis(tert.-butyl peroxy)-3,3,5-trimethylcyclohexane (VI) | 90.0 |
| 2 | 1,1-bis(tert.-butyl peroxy)cyclohexane (VI) | 91.0 |
| 3 | Tert.-butyl peroxymaleate (IV) | 96.0 |
| 4 | Tert.-butyl peroxylaurate (IV) | 96.0 |
| 5 | Tert.-butyl peroxy-3,5,5-trimethyl hexanoate (IV) | 97.0 |
| 6 | Cyclohexanone peroxide (VII) | 97.0 |
| 7 | Tert.-butyl peroxyisopropyl carbonate (V) | 98.0 |
| 8 | 2,5-dimethyl-2,5-di(benzoyl peroxy) hexane (IV) | 100.0 |
| 9 | 2,2-bis(tert.-butyl peroxy) octane (VI) | 101.0 |
| 10 | Tert.-butyl peroxyacetate (IV) | 102.0 |
| 11 | 2,2-bis(tert.-butyl peroxy)butane (VI) | 103.0 |
| 12 | Tert.-butyl peroxybenzoate (IV) | 104.0 |
| 13 | Normal-butyl-4,4-bis(tert.-butyl peroxy)valerate (VI) | 105 |
| 14 | Di-tert.-butyl diperoxyisophthalate (IV) | 107 |
| 15 | Methyl ethyl ketone peroxide (VII) | 109 |

In the above table, classes (IV), (V), (VI) and (VII) show peroxyesters, peroxycarbonates, peroxyketals and ketone peroxides respectively.

The production of plastic lenses having high hardness and excellent scratch resistance is carried out by the following steps.

That is, diethylene glycol bis(allyl carbonate) (a) is mixed with at least one of organic peroxides (b) having a decomposition temperature at selected half-life value for ten hours of not higher than 80° C. and at least one of organic peroxides (c) having a decomposition temperature at selected half-life value for ten hours of 90°–110° C. in a given amount and the resulting mixture is dissolved and then directly or after preliminary polymerization, charged in a desired mold and polymerized and cast therein by gradually raising the temperature from room temperature to 90° C. for 10–30 hours. Thereafter, the shaped lens is taken out from the mold and washed and annealed under nitrogen atmosphere or vacuum for removing the distortion of the lens at a temperature of 100°–130° C. for 3–8 hours. In the case of annealing, use of ultraviolet ray in combination can shorten the annealing time.

The reason why the plastic lenses having high hardness and excellent scratch resistance can be obtained by using together organic peroxides (c) having a decomposition temperature at selected half-life value for ten hours of 90°–110° C. and having no copolymerizability to diethylene glycol bis(allyl carbonates), is presumed as follows.

Namely, until the shaped lens is taken out from the mold, the organic peroxide (b) having a decomposition temperature at selected half-life value for ten hours of not higher than 80° C. is substantially completely decomposed and the diethylene glycol bis(allyl carbonate) (a) is substantially completely polymerized. At this stage, the organic peroxide (c) having a decomposition temperature at selected half-life value for ten hours of 90°–110° C. is not substantially decomposed and is enclosed in a matrix of the polymer of diethylene glycol bis(allyl carbonate). When the lens is annealed after taking out from the mold, the organic peroxide (c) having the decomposition temperature at selected half-life value for ten hours of 90°–110° C. enclosed in the matrix is decomposed to promote the cross-linkage between the main chains of the polymer of diethylene glycol bis(allyl carbonate).

In the present invention, the concentration of the organic peroxide (b) having the decomposition temperature at selected half-life value for ten hours of not higher than 80° C. used to diethylene glycol bis(allyl carbonate) (a) varies depending upon the kind of the organic peroxide (b), the polymerization conditions, the thickness and shape of the lens and the like but in general, is 2–5% by weight, particularly 2.5–4% by weight. When the concentration is lower than 2% by weight, the polymerization time is increased and the hardness of the lens lowers. When the concentration exceeds 5% by weight, cracks are formed in the lens during polymerization and the obtained product cannot be used as a lens. The organic peroxides (c) having the decomposition temperature at selected half-life value for ten hours of 90°–110° C. may be used in admixture of two or more organic peroxides. The organic peroxides having the decomposition temperature at selected half-life value for ten hours of 80°–90° C. are decomposed to a certain degree until the lens is taken out from the mold and cracks are formed in the lens or foaming phenomenon occurs, so that such organic peroxides cannot be used. The organic peroxides having the decomposition temperature at selected half-life value for ten hours of higher than 110° C. are very slow in the decomposition at the above described annealing temperature and therefore a long time is needed for obtaining the lens having high hardness and such peroxides are not preferable.

The concentration of the organic peroxides (c) having the decomposition temperature at selected half-life value for ten hours of 90°–110° C. used to the diethylene glycol bis(allyl carbonate) (a) varies depending upon the kind of the organic peroxides, the polymerization conditions, the thickness and shape of the lens and the like but is generally 0.05–5% by weight, particularly 0.3–1% by weight.

When the concentration is lower than 0.05% by weight, the satisfactory hardness cannot be obtained, while when the concentration is higher than 5% by weight, the hardness of the lens is increased but cracks are formed during annealing and the lens becomes brittle and is readily broken and one of the characteristics of the plastic lenses is lost.

When it is intended to increase the hardness by raising the using concentration of the organic peroxides (b) having the decomposition temperature at selected half-life value for ten hours of not higher than 80° C. in the use of only said peroxides (b), the foaming occurs and cracks are formed during the polymerization and the polymerized products cannot be used as plastic lens.

When the organic peroxides (c) having the decomposition temperature at selected half-life value for ten hours of 90°–110° C. are used alone, the polymerization is very slow and when the polymerization temperature is raised for increasing the polymerization rate, cracks are formed, the foaming phenomenon occurs and the separation from the mold is caused and therefore the use of the organic peroxides (c) alone is not desirable. Furthermore, the difference of the decomposition temperature at selected half-life value for ten hours between the organic peroxides (b) and the organic peroxides (c) is preferred to be higher than 20° C.

Thus, only by using the above described organic peroxides (b) together with the above described organic peroxides (c), the plastic lenses having high hardness and excellent scratch resistance can be easily produced through the conventional production step.

The hardness of the lens can be controlled by the concentration of the organic peroxides (c) having the decomposition temperature at selected half-life value for ten hours of 90°–110° C. used.

The thus produced plastic lenses have the equal surface hardness and scratch resistance without coating a thermosetting resin to those of the plastic lenses coated with such a resin. Accordingly, any coating of the thermoplastic resins is not necessary. Therefore, all the drawbacks of plastic lenses due to the coating of thermosetting resins are obviated. Namely, (1) the troublesome step owing to the coating of the thermosetting resin and the like is not necessary. (2) The precision of surface of plastic lenses due to the coating of thermosetting resin and the like is not deteriorated and plastic lenses having complicated shapes can be produced in high precision. (3) The dyeability is similarly easy to that of the lenses having low hardness which are not coated with a thermosetting resin. (4) The working for preventing the reflection is feasible as in a glass lens.

The following examples are given for the purpose of illustration of this invention and are not intended as limitations thereof. In the examples, "parts" means parts by weight.

EXAMPLES 1-3

According to the compounding recipe shown in the following Table 3, diethylene glycol bis(allyl carbonate) (a) (trademark: CR-39, made by P.P.G. Industries, Inc.), di-isopropyl peroxydicarbonate (trademark: Perroyl IPP, made by Nippon Oil and Fats Company, Limited) as an organic peroxide (b) having a decomposition temperature at selected half-life value for ten hours of not higher than 80° C., and one of 1,1-bis(tert.-butyl-peroxy)-3,5,5-trimethylcyclohexane (trademark: Perhexa 3M, made by Nippon Oil and Fats Company, Limited), tert.-butyl peroxyisopropylcarbonate (trademark: Perbutyl I, made by Nippon Oil and Fats Company, Limited) and methyl ethyl ketone peroxide (trademark: Permek S, made by Nippon Oil and Fats Company, Limited) as an organic peroxide (c) having a decomposition temperature at selected half-life value for ten hours of 90°–110° C., were mixed and dissolved, and the resulting mixture was preliminarily polymerized at a temperature of 30°–40° C. until the viscosity of the solution became 40–60 centistokes. Then, the resulting liquid prepolymer was charged into a lens-forming mold, and polymerized and cast for 18 hours while raising gradually the temperature from room temperature up to 90° C., and then the resulting hardened polymerization product was taken out from the mold. The hardened polymerization product was subjected to an ultrasonic washing, and then annealed for 8 hours in a nitrogen gas kept at 120° C. to obtain a plastic lens. The resulting lens samples were subjected to a pencil hardness test, a Barcol hardness test, a dyeability test and a reflection-preventing working test.

The pencil hardness test was carried out according to JIS K-5400.

The Barcol hardness test was carried out according to JIS K-6911 by using a Barcol hardness tester, Type 934-1.

The dyeability test was carried out in the following manner by using a brown dye (trademark: NIKON ORMA "Brown H", made by Nippon Kagaku Kogyo Co., Ltd.). 90 cc of the dye was dissolved in water, to obtain 1 l of the solution. The resulting dyeing solution was heated up to 92° C., and a lens sample was dipped therein for 2 minutes. Then, the sample was taken out from the solution, washed thoroughly with water and then dried. The percent transmission of the dried sample was measured.

The reflection-preventing working test was carried out by a method, wherein magnesium fluoride vapor was deposited on the surface of a lens sample at a temperature of 100° C. for 15 minutes under a reduced pressure of $10^{-4}$ mmHg under an argon atmosphere, and the surface state of the thus treated sample was observed by naked eyes.

The obtained results are shown in Table 3.

TABLE 3

|  | Example 1 | Example 2 | Example 3 |
|---|---|---|---|
| CR-39 (parts) | 96.00 | 96.00 | 96.00 |
| Perroyl IPP (parts) | 3.50 | 3.50 | 3.50 |
| Perhexa 3M (parts) | 0.50 | — | — |
| Perbutyl I (parts) | — | 0.50 | — |
| Permek S (parts) | — | — | 0.50 |
| Pencil hardness (H) | 8 | 7 | 7 |
| Barcol hardness | 42 | 39 | 39 |
| Dyeability (percent transmission) (%) | 53 | 53 | 52 |
| Reflection-preventing working | transparent and uniform | transparent and uniform | transparent and uniform |

TABLE 3-continued

|  | Example 1 | Example 2 | Example 3 |
|---|---|---|---|
|  | deposited film | deposited film | deposited film |

EXAMPLES 4 AND 5

Plastic lenses were produced in the same manner as described in Examples 1-3 by using, as an organic peroxide (c) having a decomposition temperature at selected half-life value for ten hours of 90°-110° C., a mixture of Perhexa 3M and Perbutyl I or a mixture of Permek S and Perbutyl I in the compounding recipe shown in the following Table 4. The resulting plastic lenses were subjected to the same pencil hardness test, Barcol hardness test, dyeability test and reflection-preventing working test as described in Examples 1-3.

The obtained results are shown in Table 4.

TABLE 4

|  | Example 4 | Example 5 |
|---|---|---|
| CR-39 (parts) | 96.00 | 96.00 |
| Perroyl IPP (parts) | 3.50 | 3.50 |
| Perhexa 3M (parts) | 0.20 | — |
| Perbutyl I (parts) | 0.30 | 0.30 |
| Permek S (parts) | — | 0.20 |
| Pencil hardness (H) | 8 | 7 |
| Barcol hardness | 41 | 38 |
| Dyeability (percent transmission) (%) | 53 | 54 |
| Reflection-preventing working | transparent and uniform deposited film | transparent and uniform deposited film |

EXAMPLE 6

A plastic lens was produced in the same manner as described in Examples 1-3 by using a mixture of perroyl IPP and tert.-butyl peroxyisobutyrate (trademark: Perbutyl IB, made by Nippon Oil and Fats Company, Limited) as an organic peroxide (b) having a decomposition temperature at selected half-life value for ten hours of not higher than 80° C., and Perbutyl I as an organic peroxide (c) having a decomposition temperature at selected half-life value for ten hours of 90°-110° C. in the compounding recipe shown in the following Table 5. The resulting plastic lens was subjected to the same tests as described in Examples 1-3.

The obtained results are shown in the following Table 5.

TABLE 5

|  | Example 6 |
|---|---|
| CR-39 (parts) | 96.00 |
| Perroyl IPP (parts) | 2.50 |
| Perbutyl IB (parts) | 1.00 |
| Perbutyl I (parts) | 0.50 |
| Pencil hardness (H) | 6 |
| Barcol hardness | 37 |
| Dyeability (percent transmission) (%) | 55 |
| Reflection-preventing working | transparent and uniform deposited film |

COMPARATIVE EXAMPLES 1 AND 2

Plastic lenses were produced in the same manner as described in Examples 1-3 by using (a) CR-39 and (b) Perroyl IPP in the compounding recipe as shown in the following Table 6. In Comparative Example 2, the annealed lens was further applied with a silicone resin (trademark: X-12-921, made by Shinetsu Silicone Co., Ltd.), and the coated film was cured at 100° C. for 30 minutes. The resulting lenses of Comparative Examples 1 and 2 were subjected to the same pencil hardness test, Barcol hardness test, dyeability test and reflection-preventing working test as described in Examples 1-3.

The obtained results are shown in Table 6.

TABLE 6

|  | Comparative Example 1 | Comparative Example 2 |
|---|---|---|
| CR-39 (parts) | 96.50 | 96.50 |
| Perroyl IPP (parts) | 3.50 | 3.50 |
| Silicone resin | not applied | applied |
| Pencil hardness (H) | 3 | 7 |
| Barcol hardness | 32 | 39 |
| Dyeability (percent transmission) (%) | 54 | 77 |
| Reflection-preventing working | deposited film is wholly cloudy | crack occurs on the surface of deposited film |

What is claimed is:

1. A method for producing plastic lenses, which comprises:
    (A) mixing
        (a) diethylene glycol bis(allyl carbonate) with
        (b) at least one of organic peroxides having a decomposition temperature at selected half-life value for ten hours of not higher than 80° C., and
        (c) at least one of organic peroxides having a decomposition temperature at selected half-life value for ten hours of 90°-110° C., which have no copolymerizability to the diethylene glycol bis(allyl carbonate) (a), as a polymerization initiator,
    (B) casting the resulting mixture in a desired lens-forming mold while raising the temperature to about 90° C. to substantially completely decompose the organic peroxides (b) and form a shaped lens, and
    (C) then annealing said shaped lens at a temperature of about 100°-130° C. to substantially completely decompose the organic peroxides (c).

2. The method as claimed in claim 1, wherein the organic peroxides (b) having a decomposition temperature at selected half-life value for ten hours of not higher than 80° C. are at least one of organic peroxides selected from the group consisting of (I) peroxyesters, (II) peroxydicarbonates and (III) diacyl peroxides.

3. The method as claimed in claim 2, wherein the peroxyesters (I) are at least one of organic peroxides selected from the group consisting of cumyl peroxyneodecanoate, tert.-butyl peroxyneodecanoate, tert.-butyl peroxypivalate, tert.-butyl peroxy(2-ethylhexanoate), and tert.-butyl peroxyisobutyrate.

4. The method as claimed in claim 2, wherein the peroxydicarbonates (II) are at least one of organic peroxides selected from the group consisting of di-allyl peroxydicarbonate, di-methallyl peroxydicarbonate, di-isopropyl peroxydicarbonate, di-normal-propyl peroxydicarbonate, di-myristyl peroxydicarbonate, di-(2-ethoxyethyl)peroxydicarbonate, di-(methoxyisopropyl)peroxydicarbonate, di-(2-ethylhexyl)peroxydicarbonate and di-(3-methyl-3-methoxybutyl)peroxydicarbonate.

5. The method as claimed in claim 2, wherein the peroxydicarbonate (II) is isopropyl peroxydicarbonate.

6. The method as claimed in claim 2, wherein the diacyl peroxides (III) are at least one of organic peroxides selected from the group consisting of 3,5,5-trimethylhexanoyl peroxide, octanoyl peroxide, decanoyl peroxide, lauroyl peroxide, acetyl peroxide, meta-toluyl peroxide and benzoyl peroxide.

7. The method as claimed in claim 1, wherein the organic peroxides (c) having a decomposition temperature at selected half-life value for ten hours of 90°–110° C. and having no copolymerizability to diethylene glycol bis(allyl carbonate) are at least one of organic peroxides selected from the group consisting of peroxyesters (IV), peroxycarbonates (V), peroxyketals (VI) and ketone peroxides (VII).

8. The method as claimed in claim 7, wherein the peroxyesters (IV) are at least one of organic peroxides selected from the group consisting of tert.-butyl peroxymaleate, tert.-butyl peroxylaurate, tert.-butyl peroxy 3,5,5-trimethylhexanoate, 2,5-dimethyl-2,5-di(benzoyl peroxy)hexane, tert.-butyl peroxyacetate, tert.-butyl peroxybenzoate, tert.-butyl peroxyisophthalate.

9. The method as claimed in claim 7, wherein the peroxycarbonate (V) is tert.-butyl peroxyisopropylcarbonate.

10. The method as claimed in claim 7, wherein the peroxyketals (VI) are at least one of organic peroxides selected from the group consisting of 1,1-bis(tert.-butyl peroxy)-3,3,5-trimethylcyclohexane, 1,1-bis(tert.-butylperoxy)cyclohexane, 2,2-bis(tert.-butyl peroxy)octane, 2,2-bis(tert.-butyl peroxy)butane, normal-butyl-4,4-bis(-tert.-butyl peroxy)valerate.

11. The method as claimed in claim 7, wherein the ketone peroxides (VII) are at least one of cyclohexanone peroxide and methyl ethyl ketone peroxide.

12. A method for producing plastic lenses, which comprises:
(A) mixing
   (a) diethylene glycol bis(allyl carbonate) with
   (b) at least one of organic peroxides having a decomposition temperature at selected half-life value for ten hours of not higher than 80° C., and
   (c) at least one of organic peroxides having a decomposition temperature at selected half-life value for ten hours of 90°–110° C., which have no copolymerizability to the diethylene glycol bis(allyl carbonate) (a), as a polymerization initiator,
(B) casting the resulting mixture in a desired lens-forming mold while gradually raising the temperature to about 90° C. for 10–30 hours to form a shaped lens, and
(C) then annealing said shaped lens at a temperature of about 100°–130° C. for 3–8 hours or irradiating said shaped lens with ultraviolet rays.

13. A method according to claim 12, wherein said organic peroxide (b) is present in an amount of 2.5–4% by weight, and said organic peroxide (c) is present in an amount of 0.3–1% by weight.

14. A method for producing plastic lenses, which comprises:
(A) mixing
   (a) diethylene glycol bis(allyl carbonate) with
   (b) at least one of organic peroxides having a decomposition temperature at selected half-life value for ten hours of not higher than 80° C., and
   (c) 1,1-bis(t-butyl peroxy)3,3,5-trimethyl cyclohexane, having a decomposition temperature at selected half-life value for ten hours of 90°–110° C. and no copolymerizabilitiy to the diethylene glycol bis(allyl carbonate) (a), as a polymerization initiator,
(B) casting the resulting mixture in a desired lens-forming mold while raising the temperature to about 90° C. to form a shaped lens, and
(C) then annealing said shaped lens at a temperature of about 100°–130° C.

* * * * *